US011630485B2

(12) United States Patent
Wang et al.

(10) Patent No.: US 11,630,485 B2
(45) Date of Patent: Apr. 18, 2023

(54) HOUSING STRUCTURES AND INPUT-OUTPUT DEVICES FOR ELECTRONIC DEVICES

(71) Applicant: Apple Inc., Cupertino, CA (US)

(72) Inventors: Paul X. Wang, Cupertino, CA (US); Joshua P. Song, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/383,489

(22) Filed: Apr. 12, 2019

(65) Prior Publication Data

US 2020/0081492 A1 Mar. 12, 2020

Related U.S. Application Data

(60) Provisional application No. 62/772,973, filed on Nov. 29, 2018, provisional application No. 62/729,364, filed on Sep. 10, 2018.

(51) Int. Cl.
G06F 1/16 (2006.01)
G06F 3/01 (2006.01)
G09G 5/00 (2006.01)

(52) U.S. Cl.
CPC .......... *G06F 1/1647* (2013.01); *G06F 1/1626* (2013.01); *G06F 1/1639* (2013.01); *G06F 1/1686* (2013.01); *G06F 3/013* (2013.01); *G09G 5/003* (2013.01); *G06F 1/1698* (2013.01); *G06F 2200/1631* (2013.01); *G09G 2330/02* (2013.01);

(Continued)

(58) Field of Classification Search
None
See application file for complete search history.

(56) References Cited

U.S. PATENT DOCUMENTS

| 4,755,869 A * | 7/1988 | Tanaka | G03B 17/54 |
| | | | 348/759 |
| 8,353,598 B2 * | 1/2013 | Estevez | G03B 21/10 |
| | | | 353/119 |

(Continued)

FOREIGN PATENT DOCUMENTS

| CN | 102117098 A | 7/2011 |
| CN | 105452980 A | 3/2016 |

(Continued)

*Primary Examiner* — Edward Martello
(74) *Attorney, Agent, or Firm* — Treyz Law Group, P.C.; G. Victor Treyz; David K. Cole

(57) ABSTRACT

An electronic device may have input-output devices such as sensors, displays, wireless circuitry, and other electronic components mounted within a housing. The housing may have opposing front and rear walls. A display may be formed on a front side of the device and may be overlapped by a front housing wall such as a glass layer. Sensors and other components may be formed on a rear side of the device and may be overlapped by a rear housing wall. The rear housing wall may have a glass portion or other transparent structure through which projectors project images onto nearby surfaces and through which image sensors and other optical sensors receive light. The housing may be supported by a stand. An electrical component in the stand may interact with an electronic device on the stand. Wireless circuitry in an external item may wirelessly couple to wireless circuitry within the housing.

11 Claims, 12 Drawing Sheets

(52) U.S. Cl.
CPC ..... *G09G 2340/12* (2013.01); *G09G 2354/00* (2013.01)

(56) References Cited

U.S. PATENT DOCUMENTS

| | | | |
|---|---|---|---|
| 8,400,548 | B2 | 3/2013 | Bilbrey et al. |
| 8,576,199 | B1 | 11/2013 | Pryor |
| 8,629,654 | B2* | 1/2014 | Partovi .................. H02J 50/40 |
| | | | 320/108 |
| 9,535,519 | B1 | 1/2017 | Raffles et al. |
| 9,600,037 | B2 | 3/2017 | Pance et al. |
| 2002/0075459 | A1 | 6/2002 | Lin |
| 2005/0280786 | A1 | 12/2005 | Moiroux et al. |
| 2011/0164047 | A1 | 7/2011 | Pance |
| 2013/0002517 | A1* | 1/2013 | Pascolini ............. H01Q 1/2266 |
| | | | 343/878 |
| 2013/0188366 | A1* | 7/2013 | Russell-Clarke .... H05K 5/0017 |
| | | | 362/362 |
| 2014/0049911 | A1* | 2/2014 | Corbin .................. G06F 1/1643 |
| | | | 361/679.58 |
| 2014/0168056 | A1* | 6/2014 | Swaminathan ......... G06F 3/147 |
| | | | 345/156 |
| 2014/0267434 | A1* | 9/2014 | Kuncl .............. H04N 21/42204 |
| | | | 345/660 |
| 2015/0091388 | A1 | 4/2015 | Golko et al. |
| 2016/0014390 | A1 | 1/2016 | Ligtenberg et al. |
| 2016/0065903 | A1 | 3/2016 | Wang et al. |
| 2017/0032559 | A1 | 2/2017 | Chao et al. |
| 2017/0090134 | A1 | 3/2017 | Williams et al. |
| 2018/0090825 | A1 | 3/2018 | Jiang et al. |

FOREIGN PATENT DOCUMENTS

| | | |
|---|---|---|
| CN | 105608047 A | 5/2016 |
| CN | 205910637 U | 1/2017 |
| CN | 106406432 A | 2/2017 |
| CN | 107450753 A | 12/2017 |
| EP | 1551178 A1 | 7/2005 |
| EP | 3337161 A1 | 6/2018 |
| JP | 2012147931 A | 8/2012 |
| KR | 20140117491 A | 10/2014 |
| KR | 20150096474 A | 8/2015 |
| KR | 20160047578 A | 5/2016 |
| WO | 02/32123 A2 | 4/2002 |
| WO | 2015/041696 A1 | 3/2015 |

* cited by examiner

HOUSING STRUCTURES AND INPUT-OUTPUT DEVICES FOR ELECTRONIC DEVICES

This application claims the benefit of provisional patent application No. 62/729,364, filed Sep. 10, 2018, and provisional patent application No. 62/772,973, filed Nov. 29, 2018, which are hereby incorporated by reference herein their entireties.

FIELD

This relates generally to electronic devices, and, more particularly, to housings and input-output devices for electronic devices.

BACKGROUND

Electronic devices such as computers include input-output devices. Housings for the electronic devices may be formed from polymer, metal, and other materials.

If care is not taken, the input-output devices of an electronic device may not gather input as desired and/or may not provide a user with desired output. Housings for electronic devices may be formed from materials that are unsightly or that hinder the operation of input-output devices.

SUMMARY

An electronic device may have input-output devices such as sensors, displays, wireless circuitry, and other electronic components mounted within a housing. The housing may have opposing front and rear walls. The housing may include transparent materials such as glass or clear polymer and may, if desired, include polymer with embedded fibers (e.g., fiberglass). In some configurations, the front and rear walls may be formed from glass, transparent polymer, or other transparent materials. A display may be viewed through the front wall. Optical devices and other components may operate through the rear wall or other portions of the housing.

A stand may support the housing so that a display that is overlapped by the front wall may be viewed by a user. Projectors on the rear wall or other portions of the electronic device may project images onto nearby surfaces. Sensors such as gaze detection sensors, three-dimensional image sensors, cameras, and other components may operate through housing walls. Control circuitry may display images on the display and may use projectors to display images onto nearby surfaces using captured images, gaze detection information, and other information from input-output devices.

The electronic device may include wireless circuitry. The wireless circuitry may be located in the housing or the stand for the housing and may be used in transmitting or receiving wireless power and/or wireless communications signals. The stand may include a glass layer, clear polymer layer, other transparent material and/or other material. A display, wireless circuitry, or other components may operate through the transparent material and/or other materials of the stand.

DETAILED DESCRIPTION

An electronic device such as a computer may be provided with housing structures such as glass housing structures, clear polymer structures, other transparent materials, and/or other materials. Forming some or all of a housing for an electronic device from materials such as glass, transparent polymer, and other such materials may help accommodate optical components and other electrical devices. In some arrangements, the electronic device may be provided with projecting displays that help enhance the area used for providing a user with visual output. Input-output devices such as optical components, displays, projectors, sensors, wireless circuitry, and/or other electrical devices can be accommodated within a glass housing or other housing structures for the electronic device.

Figure 1:
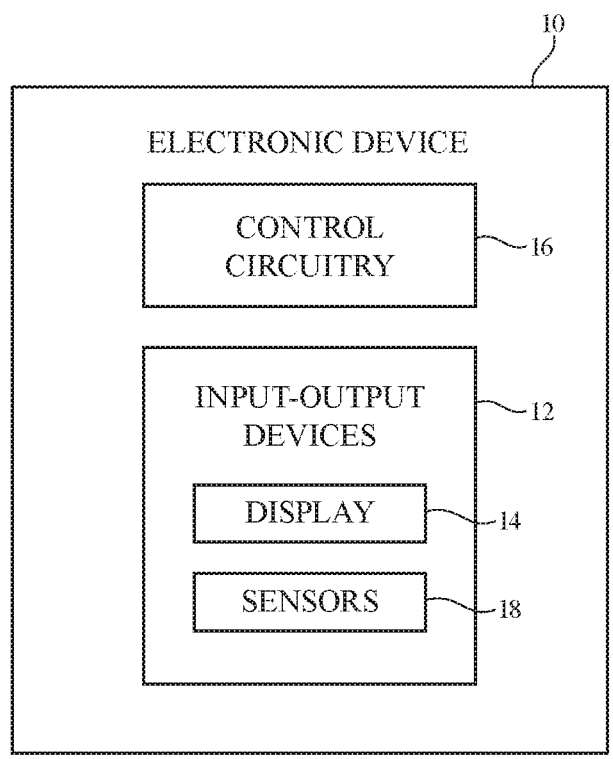
FIG. 1 is a schematic diagram of an illustrative electronic device in accordance with an embodiment.

An illustrative electronic device is shown in FIG. 1. Electronic device 10 may be a computing device such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a tower computer, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include wired and/or wireless communications circuitry (e.g., antennas and associated radio-frequency transceiver circuitry such as cellular telephone communications circuitry, wireless local area network communications circuitry, etc.). The communications circuitry of control circuitry 16 may allow device 10 to communicate with keyboards, computer mice, remote controls, speakers, accessory displays, accessory cameras, and/or other electronic devices that serve as accessories for device 10.

Input-output circuitry in device 10 such as input-output devices 12 may be used to allow data to be supplied to device 10 and to allow data to be provided from device 10 to external devices. Input-output devices 12 may include input devices that gather user input and other input and may include output devices that supply visual output, audible output, or other output. These devices may include buttons, joysticks, scrolling wheels, touch pads, key pads, keyboards, microphones, speakers, tone generators, vibrators and other haptic output devices, light-emitting diodes and other status indicators, data ports, etc.

Input-output devices 12 may include one or more displays such as display 14. Devices 12 may, for example, include an organic light-emitting diode display, a liquid crystal display, a projector display (e.g., a projector based on a micromechanical systems device such as a digital micromirror device or other projector components), a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may be a touch screen display that includes a touch sensor for gathering touch input from a user or display 14 may be a touch insensitive display that is not sensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. In some configurations, edge lit light-guide plates or other light-emitting components may be used to produce illumination for device 10 and can replace one or more displays 14 and/or portions of displays 14 in device 10. In general, any suitable light-emitting devices (displays, light-emitting diodes, lasers, lamps, etc.) may be used in emitting light (e.g., through housing 20).

Input-output devices 12 may also include sensors 18. Sensors 18 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 18 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors. In some arrangements, device 10 may use sensors 18 and/or other input-output devices to gather user input (e.g., buttons may be used to gather button press input, touch sensors overlapping displays can be used for gathering user touch screen input, touch pads may be used in gathering touch input, microphones may be used for gathering audio input, etc.).

If desired, electronic device 10 may include additional components (see, e.g., other devices in input-output devices 12). The additional components may include haptic output devices, audio output devices such as speakers, light sources such as light-emitting diodes (e.g., crystalline semiconductor light-emitting diodes for status indicators and/or displays), other optical output devices, and/or other circuitry for gathering input and/or providing output. Device 10 may also include an optional battery or other energy storage device, connector ports for supporting wired communications with ancillary equipment and for receiving wired power, and other circuitry. Systems that include device 10 may also include wired and/or wireless accessories (e.g., keyboards, computer mice, remote controls, trackpads, etc.).

Figure 2:
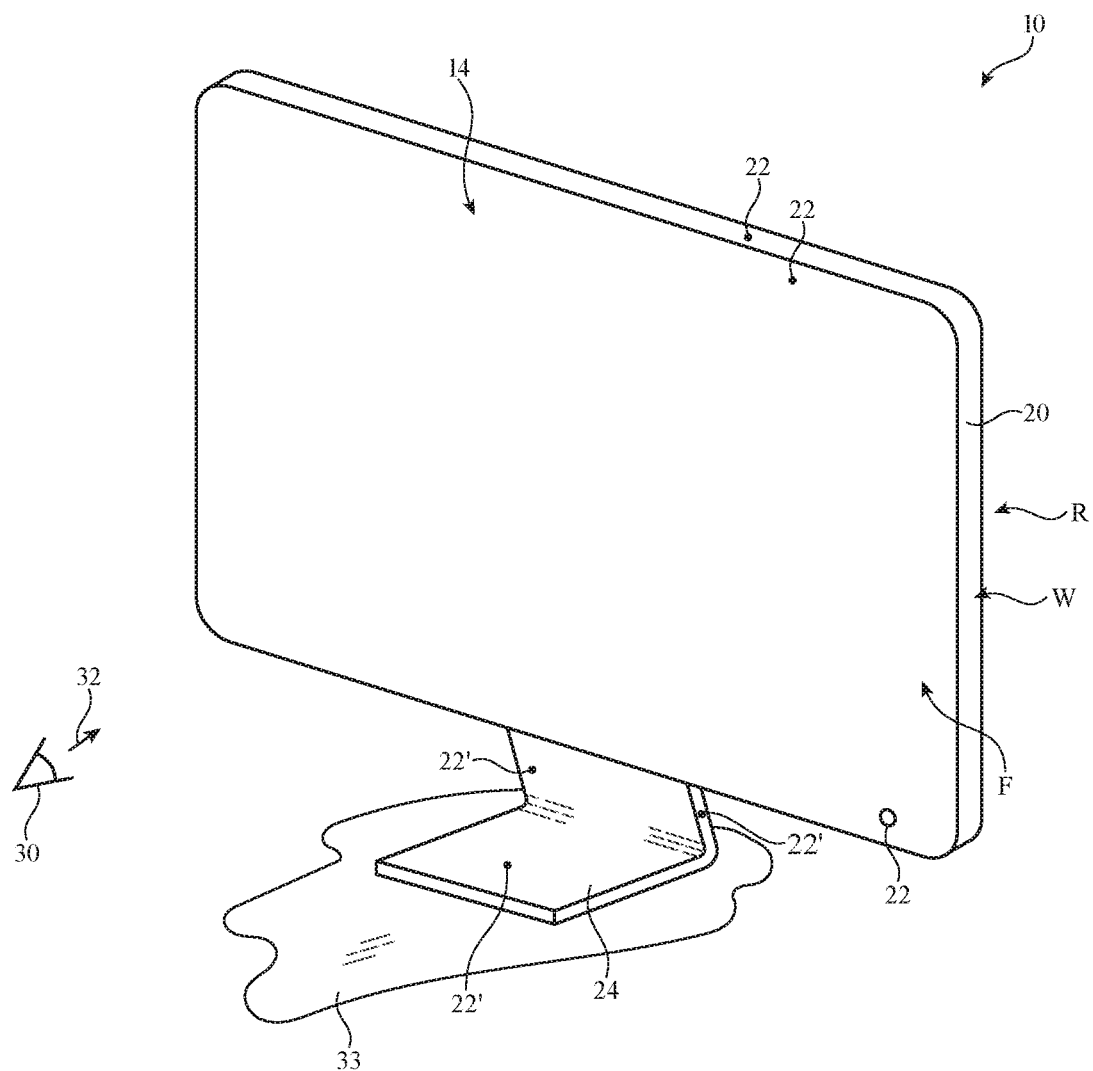
FIG. 2 is a front perspective view of an illustrative electronic device in accordance with an embodiment.

FIG. 2 is a perspective view of device 10 in an illustrative configuration in which device 10 has an optional stand (e.g., so that device 10 may serve as a stand-mounted desktop computer with an integrated display). As shown in FIG. 2, stand 24 may support housing 20 of device 10 on support surface 33 (e.g., a table top), so that display 14 may be viewed by user 30 in direction 32. Display 14 may have an active area with pixels that display an image surrounded by a pixel-free inactive area that serves as a border or display 14 may be a borderless display that is entirely covered with pixels. Housing 20 may have a rear portion on rear surface (rear face or rear side) R, a front portion on opposing front surface (front face or front side) F, and a side portion on sidewall surface (sidewall) W. Sidewall surface W may be an extended portion of rear surface R (e.g., in arrangements in which rear surface R curves towards surface F around the periphery of housing 20), may be a separate housing surface (e.g., a surface that is oriented perpendicular to front surface F and/or rear surface R), or may have other configurations. In some configurations, sidewalls W or portions of sidewalls W may be transparent and may overlap pixels in display 14 (e.g., display 14 may extend from front F onto some or all of sidewalls W).

Stand 24 and/or housing 20 may be formed from metal, glass, polymer, fiberglass and/or other polymer with embedded fibers, ceramic, crystalline material such as sapphire, fabric, wood or other natural materials, other materials, and/or combinations of these materials. These materials may include opaque materials and/or transparent materials. Stand 24 may include a solid cylinder, a solid rectangular column, or other solid support structure, may include an angled metal member or other angled support structure as shown in the illustrative arrangement of FIG. 2, may have a base and pedestal configuration, or may have other suitable shapes for supporting display 14 at a desired position relative to a table top or other support surface 33 on which device 10 is resting. If desired, stand 24 may be adjustable.

Housing 20 may include housing walls (e.g., planar or curved layers of 0-10 mm in thickness, at least 0.3 mm in thickness, less than 6 mm in thickness, or other suitable thickness that cover interior components in an interior region of device 10) and/or may include internal structures (e.g., frame members, supportive layers such as layers of metal or other materials, etc.). The front portion of housing 20, which may sometimes be referred to as a display cover layer, may cover an array of pixels in display 14. To allow images that are displayed on the array of pixels to be viewed by user 30, the display cover layer may be formed from a transparent material such as clear glass, plastic (transparent polymer), sapphire, etc. The side and rear of housing 20 may be formed from opaque materials (e.g., metal, opaque polymer, opaque polymer with embedded fibers, etc.) and/or from transparent materials (e.g., clear glass or polymer). In some arrangements, both the front and rear portions (and, if desired, the side portion) of housing 20 may be formed from glass. Transparent polymer and/or other materials may also be used. In arrangements in which transparent housing material overlaps internal device components, opaque material such as layer of opaque ink may be formed on inner surfaces of housing 20 to help block internal components from view. Transparent windows (e.g., openings) may be formed in the opaque layer to accommodate cameras, ambient light sensors, proximity sensors, three-dimensional image sensors, and/or other optical sensors.

In one illustrative configuration, which is sometimes described herein as an example, housing 20 includes a glass display cover layer and has glass on sidewall surface W and rear surface R (or at least some of these surfaces). With this optional arrangement, most or all of the exterior surface of housing 20 is formed from glass. This type of arrangement may provide device 10 with an attractive appearance and/or may help device 10 accommodate desired components such as desired optical components. Transparent materials such as transparent polymer may also be included, if desired. Illustrative mounting locations for the electronic components in device 10 (e.g., optical components and other input-output devices 12) include front surface F, sidewall surface W, and rear surface R (see, e.g., illustrative mounting locations 22 of FIG. 2, which may be used for gaze tracking sensors, image sensors, projectors, pixel arrays, edge-lit light-guide plates and other lower resolution light-emitting devices, touch sensors, wireless circuitry, and/or other components). These components may also be mounted on stand 24 (see, e.g., illustrative mounting locations 22').

Figure 3:
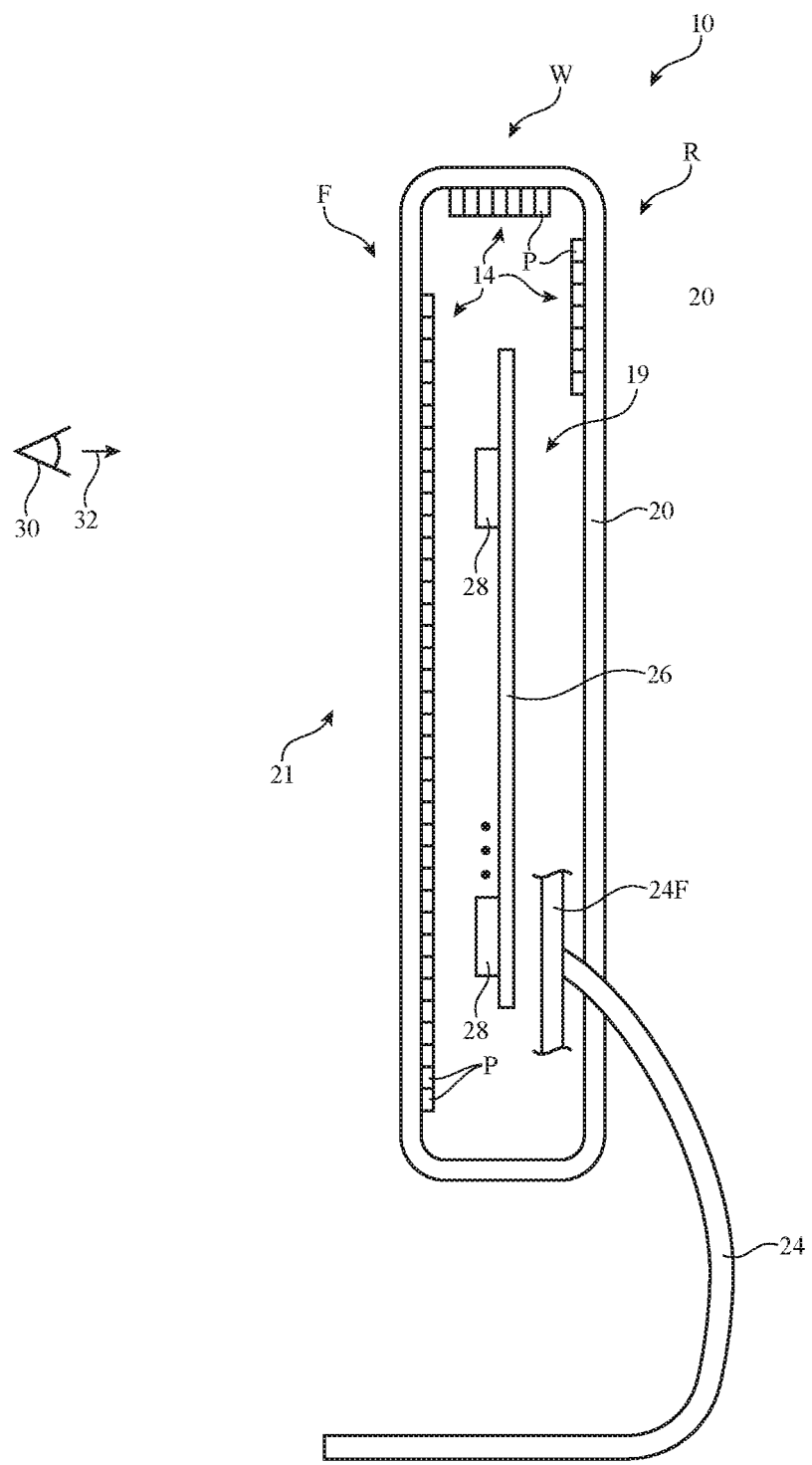
FIG. 3 is a cross-sectional side view of an illustrative electronic device in accordance with an embodiment.

A cross-sectional side view of device 10 of FIG. 2 is shown in FIG. 3. As shown in FIG. 3, housing 20 may have portions on front surface F, rear surface R and sidewall W. Sidewall W may run around the four edges of device 10 (e.g., when device 10 has a rectangular outline viewed in direction 32) and/or may have other shapes. Sidewall W may have planar portions and/or portions with a curved cross-sectional shape. Housing 20 may enclose interior region 19. Electrical components 28 may be mounted on one or more printed circuits such as printed circuit 26. In some configurations, cables and other electrical paths may be used in routing signals to and from components 28. Electrical components 28 and other structures for device 10 (e.g., control circuitry 16, input-output devices 12 of FIG. 1, etc.) may be mounted in interior region 19 and surrounded by housing 20. Housing 20 may separate interior region 19 from exterior region 21, which surrounds housing 20 and device 10.

One or more light-emitting components may be mounted within housing 20 (e.g., pixel arrays in displays, lasers, light-emitting diodes that form status indicator lights and/or that provide light to a light guide layer, etc.). As shown in FIG. 3, for example, displays 14 may be included in interior region 19. Displays 14 may include arrays of pixels P. A first display may be formed under the portion of housing 20 on front surface F may serve as the main display for device 10. An optional second display such as a strip-shaped display may run along one, two, three, or more segments of sidewall W and may form a ticker-tape-style output device (e.g., to display stock prices, weather, sports scores, etc.). An optional third display may extend over some or all of the area of housing 20 on rear surface R. These displays may be touch sensitive or insensitive to touch. In general, any one, two, or three of these displays and/or other displays 14 may be formed within interior 19 for viewing through transparent overlapping portions of housing 20. The example of FIG. 3 is illustrative.

As shown in FIG. 3, stand 24 may be coupled to internal support structures (e.g., metal plates, frame members, etc.) such as internal support 24F. Printed circuit 26 and other internal structures may be coupled to internal support 24F. Support 24F may also be coupled to housing 20 so that stand 24 can support housing 20. An opening may be formed in housing 20 (e.g., an opening in a glass housing structure) to allow metal structures associated with stand 24 to couple to internal support 24F. If desired, stand 24 may be formed from glass and/or may be coupled to a glass structure in housing 20 without forming an opening in housing 20 and/or without being coupled to an internal metal support.

Figure 4:
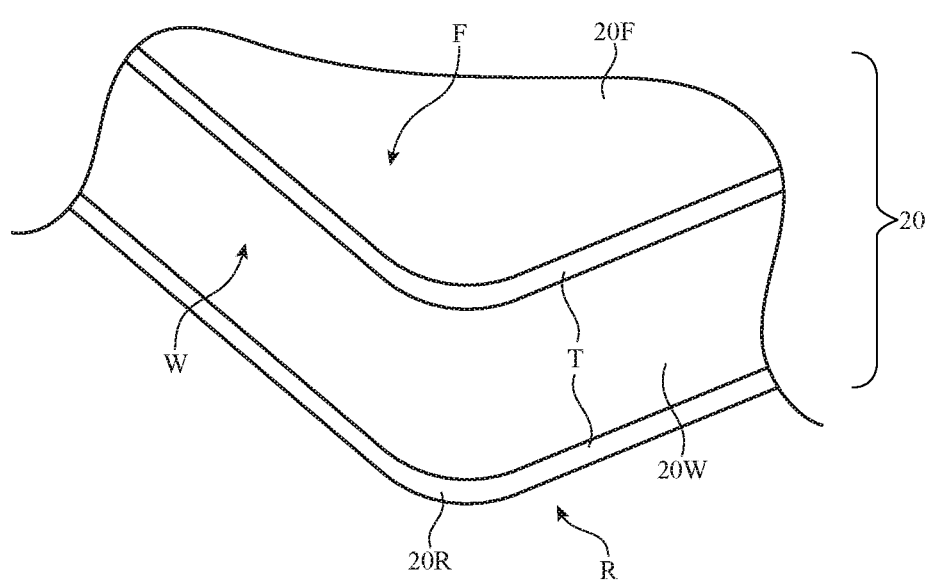
FIG. 4 is a perspective view of a corner portion of an illustrative electronic device in accordance with an embodiment.

A perspective view of a corner portion of an illustrative housing for device 10 is shown in FIG. 4. As shown in FIG. 4, housing 20 may have a front portion 20F on front surface F, an opposing rear portion 20R on rear surface R, and a sidewall portion 20W on sidewall surface W (as an example). Portions 20F, 20R, and 20W may all be formed from glass and/or one or more of these portions may be formed from other material. For example, portion 20W may be formed from metal or polymer while portions 20F and/or 20R are formed from glass, portions 20F and 20W may be formed from glass while portion 20R is formed from metal or polymer, and/or other configurations may be used. Portions 20F, 20R, and/or 20W may be formed from glass layers (e.g., sheets of glass joined using laser welds, glass frit, polymer adhesive joints, and/or other coupling mechanisms). If desired, trim members (e.g., strips of polymer trim, metal trim, and/or other trim) may be formed at seams T between the portions of housing 20 of FIG. 4.

Figure 5:
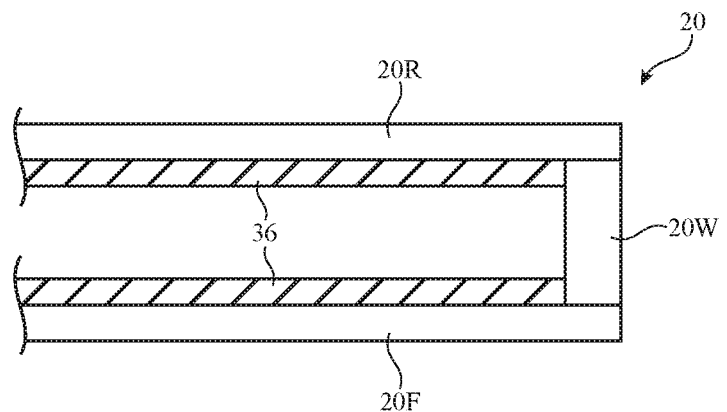
FIGS. 5, 6, and 7 are cross-sectional side views of illustrative electronic device housing structures in accordance with embodiments.

FIG. 5 is a cross-sectional side view of a portion of housing 20 in an illustrative arrangement in which internal layers 36 (e.g., metal sheets or other internal support structures) have been attached to the inner surfaces of rear portion 20R (e.g., a rear glass housing wall) and front portion 20F (e.g., a front glass housing wall, sometimes referred to as a display cover layer). Sidewall portion 20W may be free of metal supporting structures or metal supporting structures such as internal layers 36 may also be attached to sidewall portion 20W. Layers 36 may be attached to the glass portions of housing 20 using layers of adhesive (as an example). If desired, an intervening ink layer and/or other layers of material (e.g., metal, a dielectric thin-film mirror or other thin-film interference filter layer) may be formed between the adhesive layer and the glass portions of housing 20 (e.g., to provide device 10 with a desired appearance when viewed from exterior region 21). Glass frit, laser welds, adhesive joints, and/or other joints may be formed to couple pieces of housing 20 together (e.g., to join portion 20R and portion 20F to portion 20W).

Figure 6:
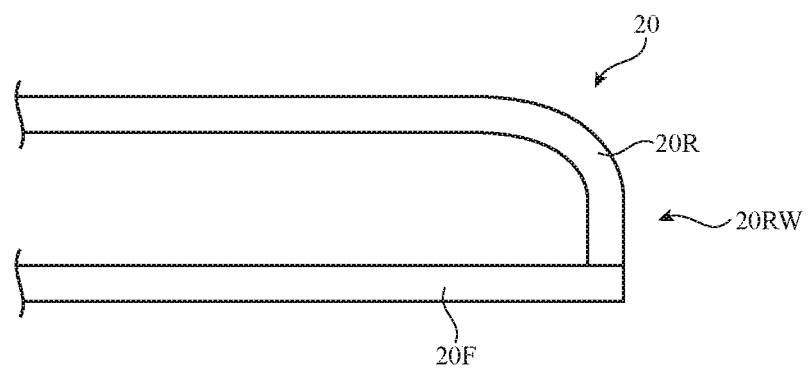
Figure 7:
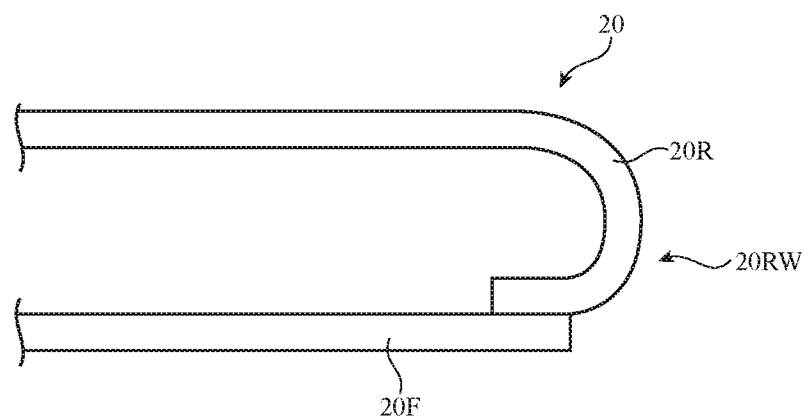

In the example of FIG. 6, rear portion 20R has an integral curved sidewall portion 20RW that forms the sidewall surface for housing 20. Portions 20R and 20F may be coupled using glass frit, laser welds, adhesive joints, and/or other joints. FIG. 7 shows how integral sidewall portion 20RW of rear portion 20R may bend sufficiently to form a sidewall for housing 20 that has a rounded appearance (e.g., portion 20RW may be curved back on itself). Other arrangements for joining two or more glass layers to form housing 20 may be use, if desired. In some configurations, optional trim may be formed between glass seams in housing 20.

Figure 8:
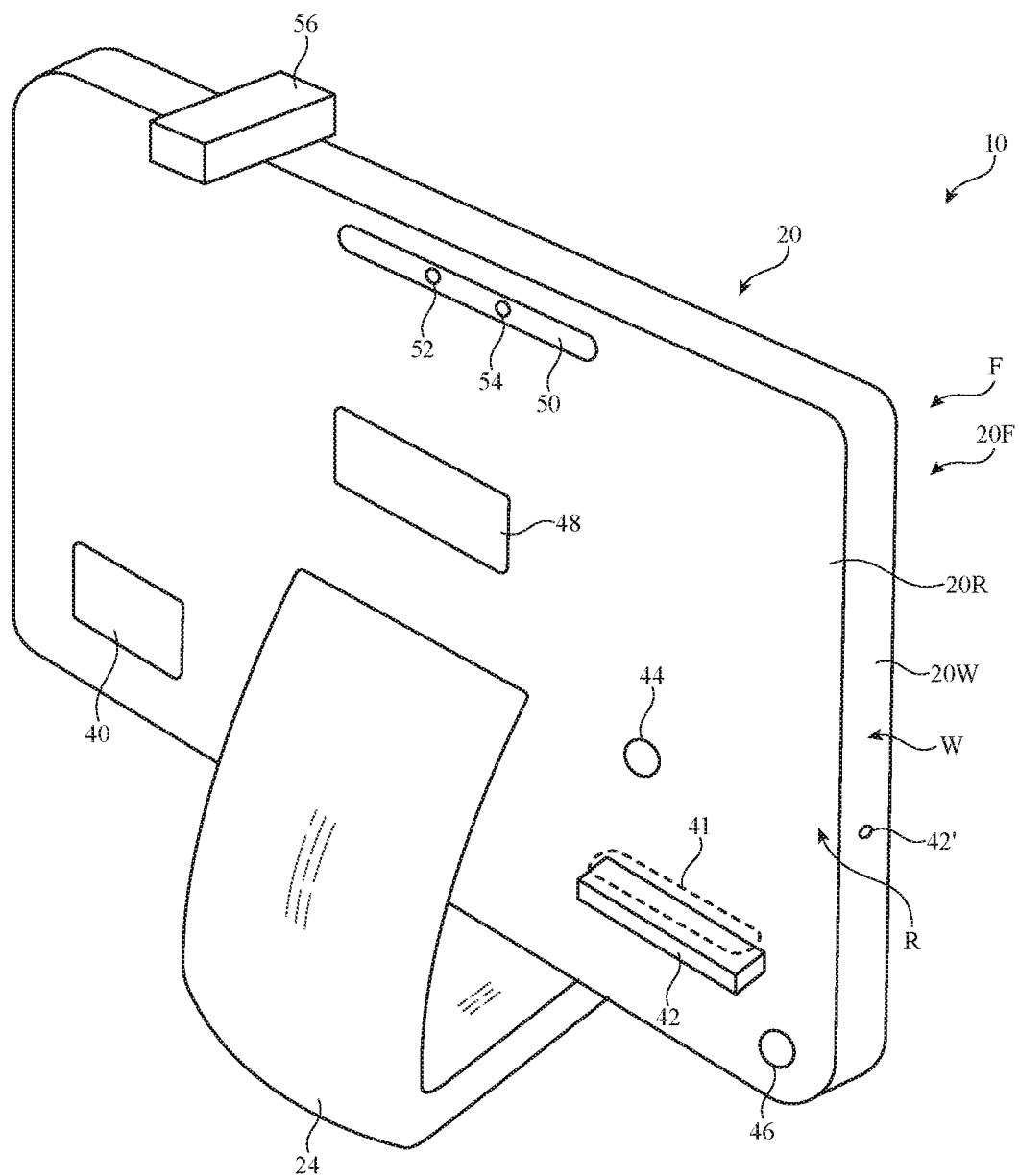
FIG. 8 is a rear perspective view of an illustrative electronic device in accordance with an embodiment.

FIG. 8 is a rear perspective view of device 10 in an illustrative arrangement in which input-output devices 12 have been incorporated into device 10. As shown in the example of FIG. 8, rear portion 20R of housing 20 may have windows (e.g., portions that are not covered by ink or other opaque masking material) such as a window in area 44. A camera (e.g., a digital image sensor and lens) may be mounted under a window in area 44 so that images may be captured of objects located to the rear of device 10. Cameras in device 10 may operate at visible wavelengths, infrared wavelengths, and/or ultraviolet wavelengths. As an example, device 10 may have one or more visible image sensors such as a visible digital image sensor that operates through a window or other portion of rear portion 20R or through other portions of housing 20 (e.g., through a glass housing wall).

If desired, housing 20 may have one or more areas that include mechanical buttons (e.g., buttons with movable button members and associated switches that are configured to operate through an opening in housing 20) and/or one or more that are provided with touch sensor buttons (e.g., buttons that detect user button activation using capacitive sensing). As shown in FIG. 8, housing 20 (e.g., rear housing portion 20R or, if desired, portion 20W or portion 20F) may have a touch sensor button such as a power button and/or other control buttons in button area 46.

A wireless input device such as stylus 41 may be supported using a support structure such as tray 42 and/or may be coupled magnetically to a portion of housing 20 (e.g., portion 20 W, portion 20F, or portion 20 W). For example, magnetic structures (magnets, iron members, etc.) may be provided within housing 20 in a location such as stylus mounting location 42' so that stylus 41 may be removably attached to location 42' (e.g. for temporary storage, for wireless charging, etc.). A display device such as a projector may be located in an area of display 14 such as area 48 (e.g., under a window). Projectors may also be located behind sidewall portions 20 W and/or front portion 20F. During operation, the projectors may project images onto nearby surfaces such as walls, a tabletop or other support surface on which device 10 is resting (e.g., images may be projected through glass housing walls or other transparent housing walls such as transparent polymer walls). Projected images may have the same resolution as other displayed images (e.g., an image being displayed on display 14) or may have a higher resolution or a lower (coarser) resolution.

Device 10 may have ports for receiving external cables for power and/or data. For example, housing 20 may have a power port and/or a data port in one or more areas such as port area 40 of rear housing portion 20R. The port in area 40 may have contacts (e.g., power and/or data pins that mates with corresponding contacts on an external cable) and/or may use wireless circuitry to receive power and/or data wirelessly through housing 20 (e.g., through capacitive coupling and/or inductive coupling arrangements). Magnetic structures (iron bars and/or magnets) and/or other attachment mechanisms may be formed in port area 40 to hold a cable plug on the end of an external cable in place within area 40.

A sensor such as a three-dimensional image sensor may be mounted in housing 20. For example, a three-dimensional image sensor may be formed in area 50 of rear housing portion 20R or other portion of housing 20. The three-dimensional image sensor may be a structured light sensor that has a light-emitting device such as device 52 that emits an array of light beams through housing 20. The light beams may be, for example, infrared light beams. Device 52 may include an array of lasers (e.g., vertical cavity surface emitting lasers) that generate the infrared light beams. The three dimensional image sensor may also include a light detector such as infrared image sensor 54 that gathers images of the infrared light beams through housing 20 as the infrared light beams illuminate a target object. Control circuitry 16 can process the captured images to reconstruct three-dimensional images of the target object. Additional components (e.g., one or more additional input-output devices 12) may also be located in area 50 and/or other portions of housing 20 and may operate through housing 20. If desired, three-dimensional sensing, position sensing, and/ or other sensing may be performed using other sensors (e.g., an ultrasonic sensor, a radio-frequency sensor (radar sensor), a light-based position sensor (lidar), etc. These sensors may generate position information on external objects and/or may generate three-dimensional maps of the shapes of external objects. If desired, device 10 may be configured to use a projector such as a projector in area 48 on rear face R or elsewhere in device 10 to project images (e.g., computer-generated content) onto non-planar objects (e.g., onto real-world objects in a potentially cluttered environment surrounding device 10). The projected images may be predistorted by the control circuitry of device 10 based on knowledge of the three-dimensional shapes of the real-world objects that is gathered using one or more sensors such as one or more three-dimensional image sensors (e.g., based on depth mapping performed by device 52). In this way, flat images (computer-generated content with text and other virtual objects that appears flat and undistorted) may be viewed by a user, even when the surfaces onto which the computer-generated content is being projected are not flat.

In some arrangements, accessory devices such as accessory device 56 may be coupled to housing 20 (e.g., using magnets, adhesive, fasteners, etc.). Device 56 may include one or more cameras, a gaze tracking system, a projector or other display, and/or other accessory that supplies additional input-output devices (e.g., devices such as devices 12 of FIG. 1 that are coupled to device 10 using wired and/or wireless links).

Figure 9:
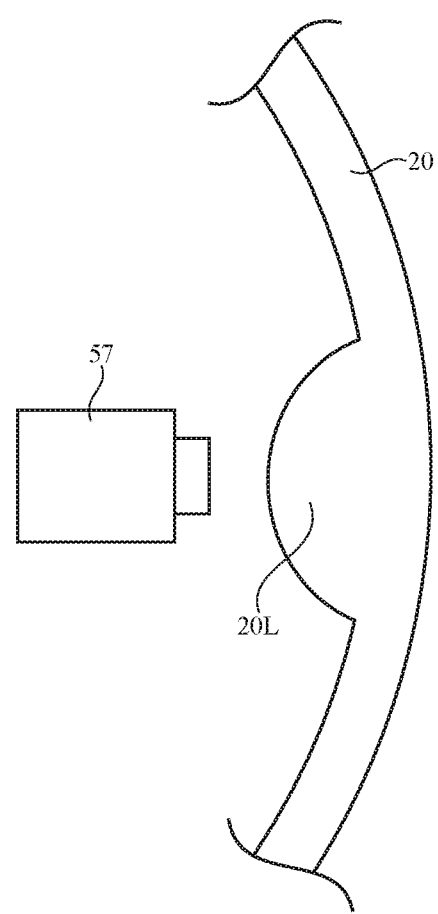
FIG. 9 is a cross-sectional side view of an illustrative portion of an electronic device housing structure and an associated optical component in accordance with an embodiment.

If desired, a portion of housing 20 such as portion 20L of FIG. 9 may be configured to serve as a lens (e.g., a convex lens or other suitable lens). This lens may be used with additional optical structures (e.g., one or more optional additional lens elements) and an associated optical component (component 57) such as a camera or projector. An image sensing device that is aligned with the lens formed from portion 20L may include a visible digital image sensor and/or an infrared digital image sensor and may be used as part of a sensor (e.g., a three-dimensional image sensor, a two-dimensional image sensor, a gaze tracking system, a gesture sensor, etc.). Projectors may be used in emitting light that creates images on nearby surfaces after passing through the lens formed from portion 20L. As shown in FIG. 9, by forming a lens from portion 20L and/or a separate lens element that is aligned with optical component 57 (e.g., a two-dimensional camera, a three-dimensional image sensor, a projector, etc.), optical component 57 can operate through housing 20 (e.g., to capture images, to project images, etc.).

Figure 10:
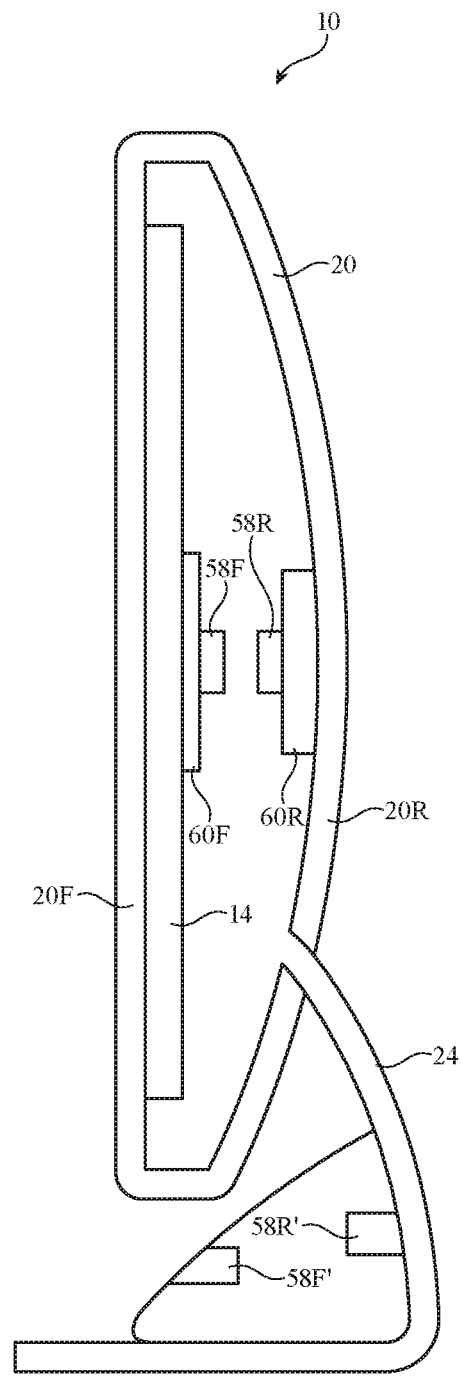
FIG. 10 is a cross-sectional side view of an illustrative electronic device with electrically adjustable shutters in accordance with an embodiment.

FIG. 10 is a cross-sectional side view of device 10 in an illustrative configuration in which projectors 58F and 58R are configured to project images through front portion 20F of housing 20 and rear portion 20R of housing 20, respectively. Active shutters 60F and 60R such as liquid crystal shutters, electronic ink shutters, and/or other electrically adjustable light modulators may be used to selectively hide the projectors from view from the exterior of device 10. Control circuitry 16 (FIG. 1) can adjust the states of shutters 60F and 60R, so that these shutters are opaque and thereby block internal components such as projectors from view or so that these shutters are transparent and thereby allow projected image light from the projectors to exit the interior of device 10.

In the illustrative configuration of FIG. 10, projector 58F projects an image through active shutter 60F and front housing portion 20F when shutter 60F is transparent. If desired, a portion of display 14 (e.g., a transparent display portion) may be interposed between housing portion 20F and front projector 58F. Projector 58R may project an image through active shutter 60R and rear housing portion 20R when shutter 60R is transparent. When projectors 58F and 58R are not in use, shutters 60F and 60R may be placed in an opaque state to help block projectors 58F and 58R from view from the exterior of device 10. Projectors (and, if desired, shutters that overlap the projectors) may be located in stand 24. For example, projector 58F may be located at forward-facing position 58F' to project images onto a surface in front of device 10, whereas projector 58R may be located at rearward-facing position 58R' to project images onto a surface behind device 10. Wireless circuitry, displays, and/or other input-output devices 12 may also be mounted in stand 24.

Figure 11:
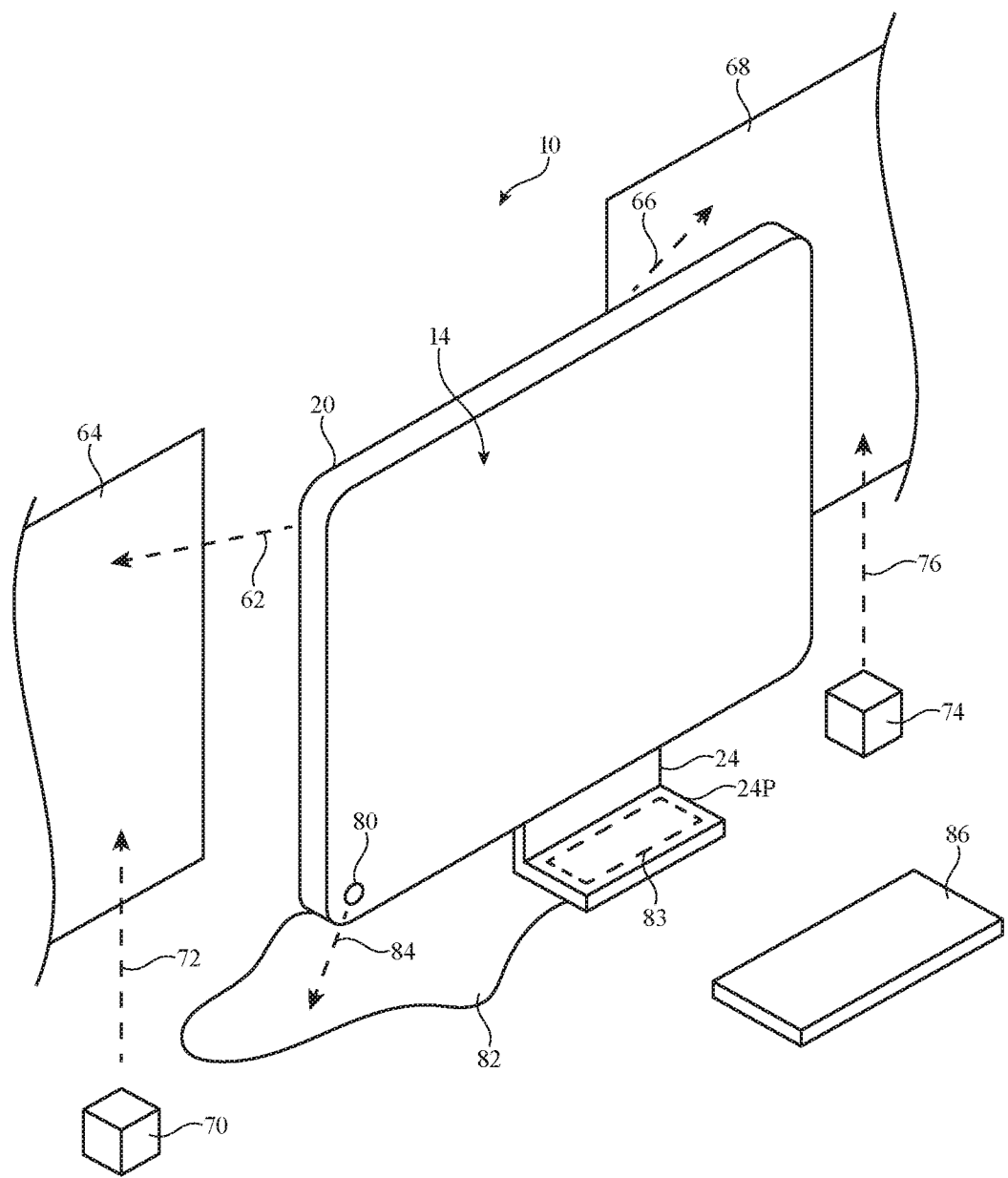
FIG. 11 is a perspective view of an illustrative system with an electronic device in accordance with an embodiment.

FIG. 11 is a perspective view of device 10 in a system environment in which projectors are being used to project images onto surfaces in the vicinity of device 10. As shown in FIG. 11, a first projector located in a left rear portion of housing 20 may project image 64 in direction 62 onto a wall or other surface to the left of device 10, whereas a second projector located in a right rear portion of housing 20 may project image 68 in direction 66 onto a wall or other surface to the right of device 10. If desired, accessory projectors that are linked to device 10 by wired and/or wireless connections may be used to project images onto nearby surfaces. For example, accessory projector 70 may project image 64 in direction 72 and/or accessory projector 74 may project image 68 in direction 76. Images 64 and 68 may be associated with an image being presented on display 14. For example, images 64 and 68 may be extended portions of an image being displayed on display 14.

If desired, additional images may be projected by projectors in device 10. For example, image 82 may be projected in direction 84 from a projector in region 80 of device 10. Image 82 may, for example, be projected onto a tabletop or other support surface on which stand 24 and device 10 are resting and/or may be projected onto other surfaces under, to the side of, behind, and/or in front of device 10. Projected image 82 may, as an example, include content that is extended from main display 14 and/or that is related to the content of main display 14. As an example, if a view of a grassy park is display on display 14, projected image 82 may include a grassy lawn that extends from grass in the image on display 14 and/or may include a diffuse green light or other light that is thematically associated with the grass being displayed on display 14.

Accessories such as computer mice, keyboards, remote control devices, and/or other accessories (see, e.g., accessory 86) may be used in controlling device 10. For example, a user of device 10 may use a keyboard or other accessory 86 to supply text, pointing commands, and/or other information to device 10 over a wired or wireless connection.

Stand 24 may support housing 20 on a support surface onto which image 82 is projected. Stand 24 may be formed from glass (e.g., a solid glass structure, a structure with a hollow interior region surrounded partially or completely by glass walls, a structure with metal and glass portions or other structures, etc.) and/or may be formed from other materials (opaque and/or transparent polymer, metal, etc.). Stand 24 may, if desired, have a portion such as portion 24P (e.g., a planar portion that runs horizontally and that is characterized by a vertical surface normal) that is configured to receive and support a removable electronic device such as a cellular telephone, stylus, or other external item. Portion 24P and/or other portions of stand 24 may be formed from glass, polymer, or other dielectric to accommodate transmission of light (e.g., through clear dielectric) and/or transmission of wireless data and/or power signals.

Portion 24P of stand 24 and/or other portions of stand 24 may have an interior portion that contains one or more electrical components such as electrical component 83. Electrical component 83 may include a display (pixel array) that displays images, wireless circuitry (e.g., circuitry for handling wireless power and/or wireless data), sensors, and/or other input-output devices. For example, component 83 may include a wireless signal structure such as a capacitive coupling plate or a coil that wirelessly couples with a corresponding wireless signal structure (capacitive coupling electrode or coil) for use in wireless signal transmission and/or reception. Wireless power circuitry in component 83 may be used in transmitting and/or receiving wireless power and wireless communications circuitry in component 83 may be used in transmitting and/or receiving wireless communications signals.

As an example, wireless power can be wirelessly transmitted from component 83 (e.g., a coil, capacitor plate, or other wireless power transmitting structure) in portion 24P to a portable electronic device resting on portion 24P, wireless communications signals can be wirelessly transmitted from component 83 to the portable device, and/or component 83 may receive wireless power and/or wireless data signals from the portable device. In some configurations, electrical component 83 may be configured to emit light that passes through portion 24P. For example, electrical component 83 may have one or more light-emitting diodes or other components that emit light, component 83 may be a pixel array configured to display images that are visible through the glass or other transparent material of portion 24P and/or that are visible through other portions of stand 24, component 83 may be a projector, and/or component 83 may have other circuitry configured to emit light. In general, electrical component 83 may be mounted in planar portion 24P of stand 24 and/or other portions of stand 24 and may be any suitable input-output device (see, e.g., input-output devices 12 of FIG. 1) or other electrical component for device 10.

Figure 12:
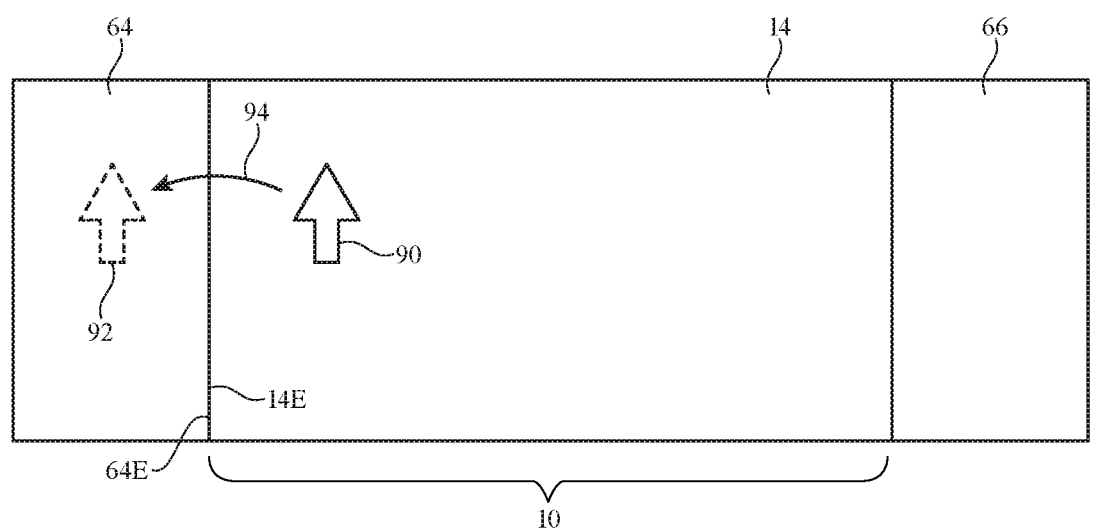
FIG. 12 is a front view of an illustrative electronic device showing how images may be projected onto adjacent surfaces in accordance with an embodiment.

As shown in FIG. 12, content from main display 14 may be moved between display 14 and ancillary display regions formed from adjacent projected images 64 and 66 (and/or a projected image on the support surface on which stand 24 is resting). In this way, images 64 and 66 (and/or a support surface image) may help expand the effective size of display 14. In the example of FIG. 12, a user is moving on-screen object 90 from main display 14 onto left image 64 in direction 94 (see, e.g., moved object 92). The edges of images 64 and 66 may blend seamlessly (or nearly seamlessly) with adjacent edges of display 14 to create a continuous computer desktop. For example, the content displayed at left edge 14E of display 14 may match the content displayed at right edge 64E of projected image 64. During operation, an input-output device in device 10 and/or a computer mouse, a trackpad, or other accessory input device (see, e.g., accessory 86 of FIG. 11) may be used in supplying user input that moves on-screen objects such as object 90 seamlessly between projected images such as images 64 and 66 and adjacent portions of main display 14 and/or other projected image areas. The use of projectors (e.g., projectors in device 10 and/or accessory projectors) in displaying images adjacent to device 10 that serve as extensions to display 14 provides a user of device 10 with additional workspace and/or additional areas to receive visual content from device 10.

Figure 13:
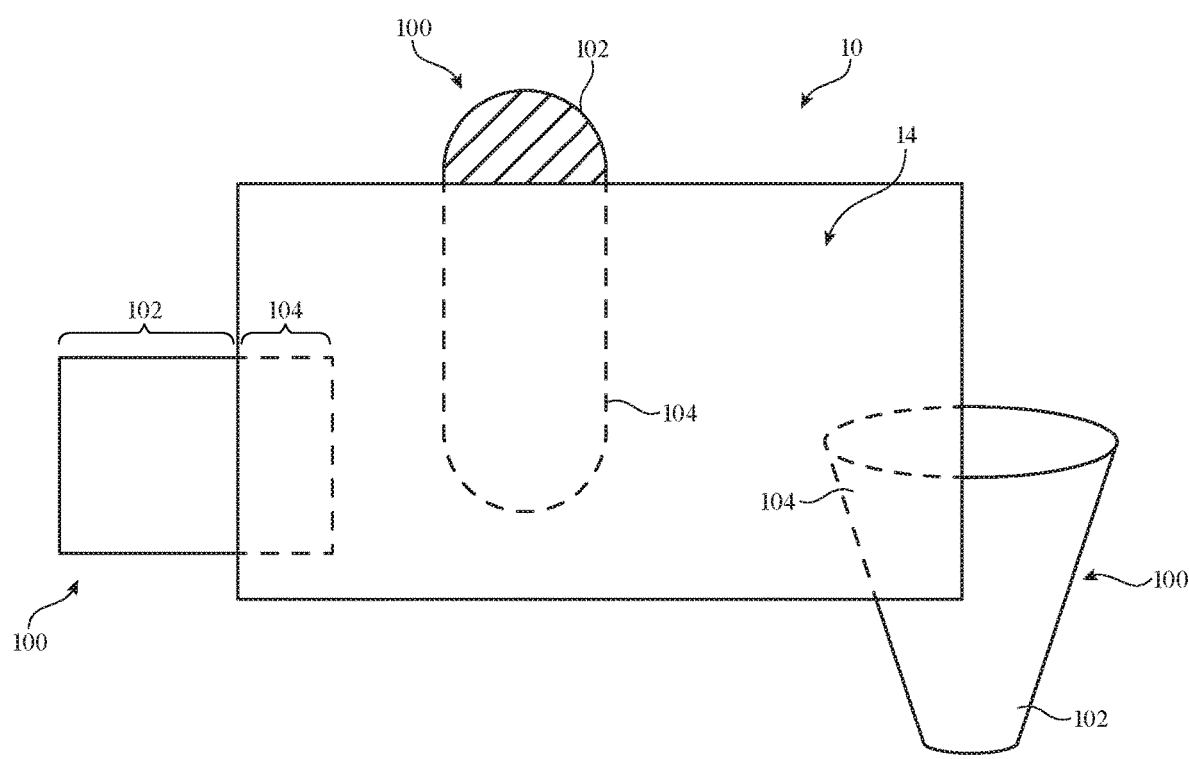
FIG. 13 is a front view of an illustrative electronic device showing how images from a camera may be displayed on a display in the electronic device to reveal objects that would otherwise be partly or fully obscured by the electronic device in accordance with an embodiment.

If desired, cameras on device 10 can capture images of real-world objects. These images can be displayed on display 14. Images of real-world objects may, for example, be displayed on display 14 in positions that make display 14 appear to be transparent to a user. Consider, as an example, the illustrative configuration of FIG. 13. In the example of FIG. 13, device 10 is positioned so that display 14 is overlapping real-world objects 102. The overlap between display 14 and objects 100 in this example is partial, so that portions 102 of objects 100 are not blocked from view by display 14 and are directly viewable by the user of device 10. Portions 104 of objects 100 are blocked by display 14 and are not directly viewable through display 14 due to the presence of opaque structures within display 14.

Although portions 104 cannot be viewed directly, a camera on the rear of device 10 or other image sensor circuitry may capture an image that contains portions 104 and this image may be displayed in real time on display 14 in alignment with the locations of the blocked portions. In some arrangements, three-dimensional location information (e.g., three-dimensional images from a three-dimensional sensor) may be used to determine the location in three dimensions of portions 104. A gaze tracking sensor (sometimes referred to as a gaze tracker or gaze tracking system) may be located on the front side of device 10 to gather information on the location of the user's eyes. Control circuitry 16 can use information from the gaze tracking sensor to determine the position of the user's eyes and can use the output of the three-dimensional image sensor or other position sensor circuitry to determine the position of portions 104 of objects 100. From the known positions of objects 104, display 14, and the user's eyes, control circuitry 16 can then position captured images of portions 104 on display 14 in a location (and with appropriate optional image warping) that ensures that the these images of portions 104 are satisfactorily aligned with portions 102 of real-world objects 100. In this way, the user will view objects 100 in their entirety. Portions 102 will be viewed directly as real-world items and portions 104 will be viewed as virtual items on display 14. Display 14 will, in effect, appear transparent to the user (e.g., display 14 will be virtually transparent).

If desired, the virtual transparency of display 14 can be adjusted dynamically. For example, a user may supply input to device 10 that enables or disables this see-through feature. As another example, a three-dimensional image sensor or other sensor circuitry in device 10 can be used by control circuitry 16 to detect movement behind display 14. In the absence of movement, display 14 will not display virtual objects associated with blocked portions of the real world. In response to detecting movement (e.g., movement of a person who has walked up behind display 14 to speak to the user of device 10), control circuitry 16 can automatically display captured images of blocked objects on display 14 (e.g., the virtual transparency of display 14 can be automatically turned on based on detected movement). Other triggering activities may also be used to automatically invoke (or turn off) virtual transparency (e.g., activities detected using voice detection, noise detection, voice command recognition, visual pattern recognition such as facial recognition or other image recognition, user gaze direction detection such as detection of a lingering gaze on a location just beyond the periphery of display 14 or detection of a gaze on display 14, etc.).

Figure 14:
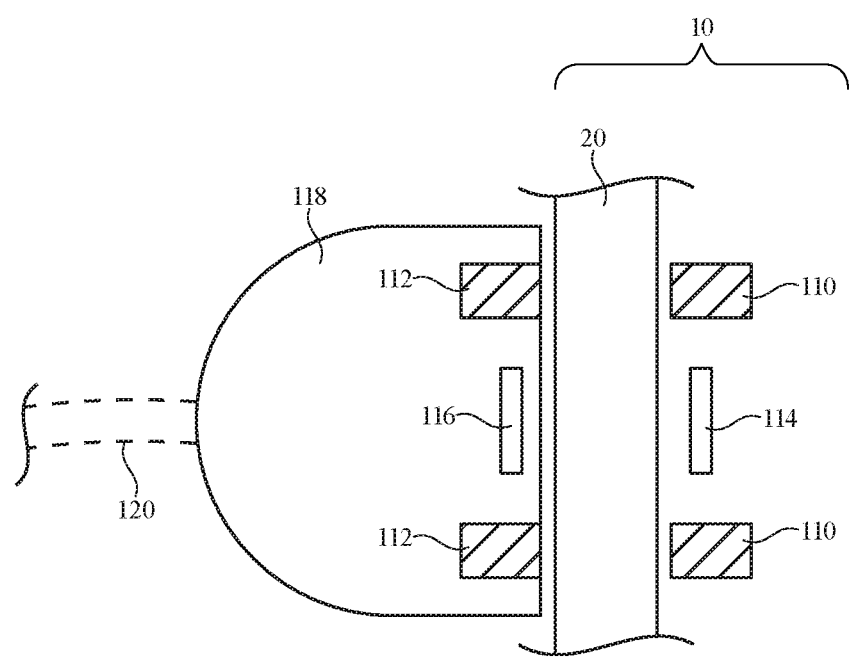
FIG. 14 is a cross-sectional side view of an illustrative electronic device and an associated external device in accordance with an embodiment.

FIG. 14 is a cross-sectional side view of an illustrative external item (item 118) that is located adjacent to an outer surface of housing 20 of device 10. Item 118 may be a plug for a cable such as optional cable 120, may be a stylus (see, e.g., stylus 41 of FIG. 8), may be a computer accessory other than a stylus (e.g., a computer mouse, a trackpad, a keyboard, a camera, a projector or other display device, etc.), may be a portable device such as a cellular telephone, or may be other external device. During operation, item 118 may be attached to device 10. For example, a mounting bracket, ledge, hook-and-loop fastening material, screws or other fasteners, clips, and/or other mounting structures may be used to temporarily attach item 118 adjacent to housing 20. In the illustrative example of FIG. 14, item 118 has magnetic structures 112 and device 10 has magnetic structures 110. Magnetic structures 112 and 110 may include magnetic material (e.g., iron bars, etc.) and/or magnets (e.g., permanent magnets and/or electromagnets). Magnetic structures 110 may be located within the interior of device 10 behind housing 20.

Item 118 may contain wireless signal structure 116 and device 10 may contain a mating wireless signal structure 114. Wireless signal structures 116 and 114 may include respective capacitive coupling plates (e.g., a pair of mating capacitor plates for capacitively coupled wireless power transfer and/or capacitively coupled wireless communications) or respective coils (e.g., a pair of mating coils for inductive wireless power transfer and/or near-field inductive wireless communications). Structures 116 and 114 are wirelessly coupled (e.g., via capacitive or inductive coupling).

When it is desired to temporarily couple item 118 to device 10, magnetic structures 112 may be placed into alignment with magnetic structures 110, so that structures 112 are magnetically attracted toward structures 110. This attracts item 118 toward device 10 so that structures 116 and 114 are wirelessly coupled to each other (e.g., so that structures 116 and 114 are capacitively or inductively coupled with each other). Structures 116 and 114 may then be used to transfer power wirelessly and/or to communicate wirelessly. For example, in a scenario in which structure 116 is a capacitor plate and structure 114 is a capacitor plate, the plates may be capacitively coupled so that wireless power can be transferred to item 10 from a power source coupled to item 118 or vice versa and/or so that wireless communications signals can be transmitted from item 118 to device 10 or vice versa. In a scenario in which structure 116 is a coil and structure 114 is a coil, the coils may be inductively coupled so that wireless power can be inductively transferred to device 10 from item 118 or from device 10 to item 118 and/or so that wireless communications signals can be transferred from item 118 to device 10 or from device 10 to item 118.

Multiple electronic devices 10 may be used in a system. For example, a user may operate a first electronic device such as a cellular telephone, tablet computer, or other portable electronic device in the presence of a second electronic device such as a desktop computer. The first and second devices may have displays (e.g., displays facing the user). The first device may be placed in front of the second device (e.g., 0.1-1 m in front of the display in the second device). In this position, the first device and its display may be interposed between the user (e.g., the eyes of the user) and the display of the second device, so that the first device (e.g., the display on the first device) occludes a portion of the display of the second device.

The second device may use a camera, a three-dimensional image sensor, magnetic sensors, light-based sensors, and/or other sensors to detect the location of the first device relative to the display of the second device and relative to the user (e.g., the second device may determine the relative location between the first and second devices and user in X, Y, and Z dimensions, angular orientations, etc.). Based on this relative position information, the second device can determine appropriate display content to supply to the first device (e.g., wirelessly) and/or the first device may share visual content and/or other information with the second device. The first device may, for example, receive the content that is provided by the second device and may display this content on a display in the first device. The content that the second device passes to the first device may be, for example, the same content on the display of the second device that is being occluded by the presence of the first device between the user and the second device. In this way, the system may be used to display the content that is occluded on the display of the second device on the display of the first device so that no content is blocked by the presence of the first device.

If desired, the system may include multiple electronic devices such as multiple desktop computers, multiple desktop monitors, or other sets of multiple devices with adjacent displays. There may be an air gap between the displays in this system. For example, when two desktop displays are placed on a user's desk in front of the user, there may be a gap between the right edge of a left-hand display and the opposing left edge of a right-hand display. To help fill the air gap, a projector in the first device and/or a projector in the second device may be used to display filler content on a surface such as a surface that is behind the devices and visible in the gap between the devices. In addition to projecting content behind the devices and/or instead of projecting content rearwardly, gap filler content and/or other content may be projected in front of the devices (e.g., in the vicinity of a keyboard, trackpad, and/or other input-output devices) to help create a visually seamless transition between different areas of displayed content.

Cameras, three-dimensional sensors, magnets and corresponding magnetic sensors, sensor circuitry that emits light rays and corresponding sensor circuitry that detects reflected light rays, and/or other sensor circuitry may be used to determine the relative locations of the devices and the user to determine where to project the filler content and to determine what filler content will visually fill detected gaps.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A computer, comprising:
a housing, wherein the housing comprises a rear glass wall;
a display mounted within the housing;
a projector configured to project an image onto a surface adjacent to the housing, wherein the projector is configured to project the image through the rear glass wall;
an input device configured to gather input; and
control circuitry configured to move a displayed object from the display to the image projected onto the surface based on the input.

2. The computer defined in claim 1 further comprising a shutter, wherein the shutter is interposed between a glass portion of the housing and the projector and wherein the control circuitry is configured to place the shutter in a transparent state when the projector is projecting the image onto the surface.

3. The computer defined in claim 1 further comprising a stand that is configured to support the housing, wherein a glass portion of the housing covers a rear surface of the housing and wherein the display is configured to display content through an opposing front surface of the housing.

4. The computer defined in claim 2 wherein the rear glass wall has a portion forming a lens element.

5. The computer defined in claim 1 further comprising a stand configured to support the housing on a support surface, wherein the projector is configured to project the image onto the support surface.

6. A computer, comprising:
a housing having opposing front and rear sides;
a display on the front side of the housing;
an input device configured to gather input;
an image sensor on the rear side of the housing, wherein the image sensor comprises a three-dimensional image sensor configured to gather three-dimensional shape information on a real-world object;
a projector configured to project an image onto the real-world object based on the gathered three-dimensional shape information;
a gaze tracking sensor; and
control circuitry configured to display an image captured with the image sensor on the display using information from the gaze tracking sensor.

7. The computer defined in claim 6 further comprising a stand configured to support the housing on a support surface, wherein the housing comprises a glass wall on the rear side.

8. The computer defined in claim 6 further comprising:
a stand configured to support the housing on a support surface; and
a projector configured to project onto the support surface.

9. The computer defined in claim 6 wherein the front side of the housing has a front layer of glass and a front metal layer attached to the front layer of glass and wherein the rear side of the housing has a rear layer of glass and a rear metal layer attached to the rear layer of glass.

10. The computer defined in claim 6 further comprising:
a stand configured to support the housing,
wherein the stand has a glass planar portion; and
an electronic component overlapped by the glass planar portion of the stand, wherein the electronic component comprises an electronic component selected from the group consisting of: a pixel array, a wireless communications circuit, and a wireless power circuit.

11. The computer defined in claim 6 wherein the housing has transparent sidewalls and wherein the display has pixels on the front side and pixels under the transparent sidewalls.

* * * * *